United States Patent
Craighead et al.

(10) Patent No.: US 7,473,361 B2
(45) Date of Patent: Jan. 6, 2009

(54) DIFFUSION-BASED MOLECULAR SEPARATION IN STRUCTURED MICROFLUIDIC DEVICES

(75) Inventors: Harold G. Craighead, Ithaca, NY (US); Jennifer Gaudioso, Albuquerque, NM (US); Stephen W. Turner, Ithaca, NY (US)

(73) Assignee: Cornell Research Foundation, Ithaca, NY (US)

( * ) Notice: Subject to any disclaimer, the term of this patent is extended or adjusted under 35 U.S.C. 154(b) by 579 days.

(21) Appl. No.: 10/306,638

(22) Filed: Nov. 27, 2002

(65) Prior Publication Data

US 2003/0136736 A1 Jul. 24, 2003

Related U.S. Application Data

(60) Provisional application No. 60/334,614, filed on Nov. 30, 2001.

(51) Int. Cl.
*B01D 63/00* (2006.01)
*G01N 7/10* (2006.01)
*B01D 61/00* (2006.01)

(52) U.S. Cl. .............. 210/321.6; 210/198.2; 210/512.1; 210/634; 422/68.1; 422/83; 438/14

(58) Field of Classification Search .............. 210/321.6, 210/634, 97, 198.2, 656, 748, 787, 512.1; 422/68.1, 83, 99–101; 438/14; 436/174
See application file for complete search history.

(56) References Cited

U.S. PATENT DOCUMENTS

| | | | |
|---|---|---|---|
| 5,876,675 A | * | 3/1999 | Kennedy ..................... 422/99 |
| 5,922,210 A | * | 7/1999 | Brody et al. ................ 210/767 |
| 2002/0058329 A1 | * | 5/2002 | Singh et al. ............. 435/287.2 |
| 2004/0096960 A1 | * | 5/2004 | Mehta et al. ............ 435/287.2 |

OTHER PUBLICATIONS

Basic Microfluidic Concepts, Washington University, May 2, 2006; printed from the internet; <<http://faculty.washington.edu/yagerp/microfluidicstutorial/basicconcepts/basicconcepts.htm>>.*

* cited by examiner

*Primary Examiner*—Krishnan S Menon
(74) *Attorney, Agent, or Firm*—Schwegman, Lundberg & Woessner, P.A.

(57) ABSTRACT

A microfluidic device has features that reduce the speed of flow of higher speed diffusing molecules. The features are used to separate various components of a mixture in the microfluidic device. The channel is sized to ensure laminar flow of the mixture to promote only diffusive mixing of the components. Wells extend from the channel. Components having higher diffusing velocities are slowed by the wells as the mixture proceeds through the channel. The result is that slower speed diffusing components exit the channel prior to the lower speed diffusing components. The device is formed by use of photolithographic techniques or other techniques capable of forming such features.

16 Claims, 3 Drawing Sheets

DIFFUSION-BASED MOLECULAR SEPARATION IN STRUCTURED MICROFLUIDIC DEVICES

This application claims the benefit of priority under U.S.C. 119(e) to U.S. Provisional Patent Application Ser. No. 60/334,614, filed on Nov. 30, 2001, which is incorporated herein by reference.

GOVERNMENT GRANT INFORMATION

This invention was made with U.S. Government support from DARPA under Grant No. MDA 972-00-1-0021. The U.S. Government has certain rights in the invention.

FIELD OF THE INVENTION

The present invention relates to structures for separating molecules, and in particular to a microfluidic device for diffusion-based molecular separation.

BACKGROUND OF THE INVENTION

Separation of molecules is a crucial purification step in experiments and routine tests. Many separation techniques such as conventional chromatography and electrophoretic techniques result in a loss of native conformation of the molecules. Additionally, such techniques are not readily implemented in chip form compatible with lab on a chip devices. There is need for a molecule separation technique which can be implemented in chip form.

SUMMARY OF THE INVENTION

A microfluidic device has features that reduce the speed of flow of higher speed diffusing molecules. The features are used to separate various components of a mixture in the microfluidic device.

In one embodiment, wells are formed in a microfluidic channel. The channel is sized to ensure laminar flow of the mixture to promote only diffusive mixing of the components. Wells extend from the channel. Components having higher diffusing velocities are slowed by the wells as the mixture proceeds through the channel. The result is that slower speed diffusing components exit the channel prior to the faster speed diffusing components.

One microfluidic device has a two micron wide, 700 micron deep channel, fed a mixture by a cross channel or other mechanism. A plurality of opposing wells, formed substantially perpendicular to the channel are spaced approximately 10 microns from each other. The wells have four micron openings and are approximately 10 microns deep.

The device is formed by use of photolithographic techniques or other techniques capable of forming such features. Even smaller features are formed by use of electron beam lithography or X-ray lithography. The device may also be embossed from a lithographic master.

In further embodiments, the microfluidic device is integrated into a lab on a chip type of device having multifunctional microfluidic networks. On-chip post-separation enzymatic assays can also be performed on the chip on separated biological molecules.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
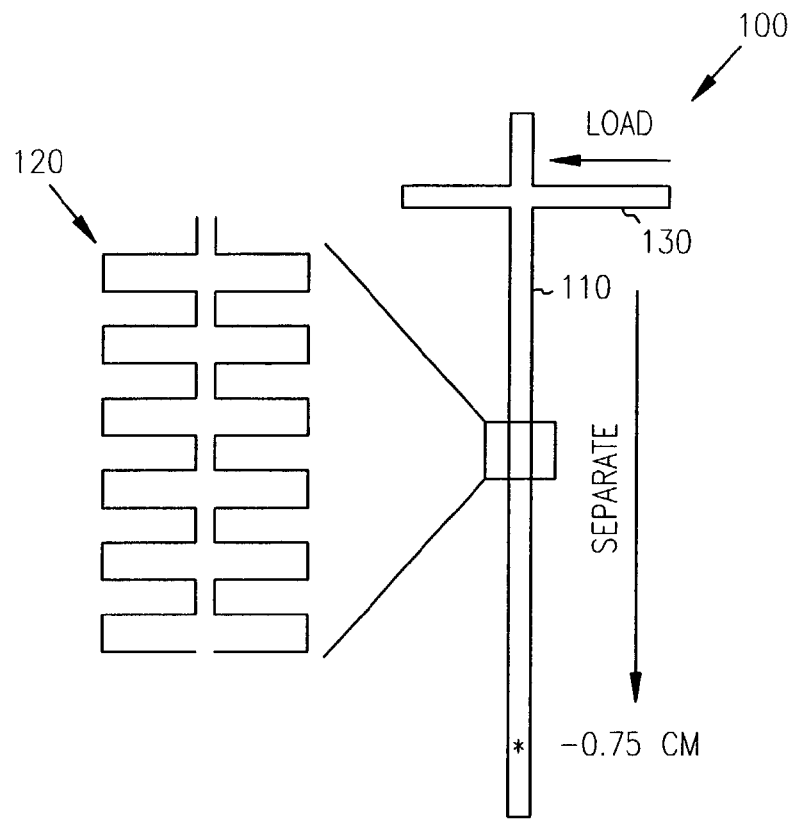
FIG. 1 is a schematic representation of a column for diffusion-based separations.

In FIG. 1, a microfluidic device for diffusion-based molecular separation is shown generally at 100. A column of the device comprises a channel 110, formed for transporting multiple compound mixtures. The column is formed of a size to promote laminar flow of the mixtures based on the Reynold's number of the mixture.

The Reynold's number is a measure that is proportional to inertial force divided by viscous force. A small Reynold's number ensures laminar flow of the mixtures. The Reynold's number for a given fluid in a given geometry is defined by $R=pvd/u$, where R is the Reynold's number, p is fluid density, v is velocity, d is diameter of the microfluidic device and u is fluid viscosity. In one embodiment, the channel is approximately two microns wide and 700 microns deep. Other size channels are used in further embodiments. The size of the channel is small enough to obtain a desired throughput, but large enough to ensure laminar flow.

The column also comprises one or more features such as wells indicated at 120 extending from the channel 110. The mixture is provided by a cross injection channel 130, intersecting the channel 110 a sufficient distance form the wells to ensure laminar flow is established by the time the mixture reaches the wells 120. The wells 120 are formed along the channel to temporarily capture faster diffusing molecules as the mixture flows through the channel. This slows down the faster diffusing molecules. Slower diffusing molecules do not enter such features as quickly, and are not delayed. As a result, slower diffusing molecules exit or elute from the column first. In this manner, molecules are separated based on diffusion rates.

In a further embodiment, selected parts of the device are coated with selectively adhesive layers to alter the passage of materials through the channel. In still further embodiments, temporary captures are provided by coating the side channels with a binding surface.

In laminar flow, diffusion dominates lateral transport of compounds. The lateral transport of the compounds determines which compounds enter the diffusion wells. In turbulent flow conditions, which molecules enter the diffusion wells is random, and less likely to cause separation of the compounds.

In one embodiment, pairs of wells extend substantially perpendicular from the channel in opposite directions. The wells have approximately four micron openings to the channel and are approximately 10 microns long. The pairs are spaced approximately 10 microns. Different configurations of wells, and different shapes of wells are used in further embodiments. In one embodiment, staggered wells alternately extend in opposite directions. Different shapes include circular shapes, triangular shapes or any other type of shape into which molecules diffuse from a channel. The flow of a mixture through a channel is less than completely laminar in one embodiment, but sufficiently laminar such that the diffusion effect results in an effective separation of molecules based on the difference in diffusion rates. The number of such wells is varied from embodiment to embodiment. In one embodiment, the number of wells is determined to ensure sufficient separation given the diffusion rates of the molecules involved and elements of randomness in diffusion. Using the above dimension structure, a binary mixture of cellulase enzymes (90 kDa and 45 kDa proteins) has been separated.

Figure 2:
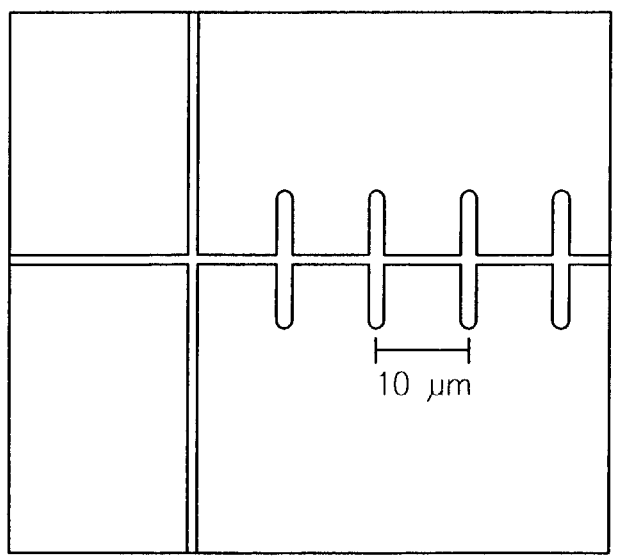
FIG. 2 is an optical micrograph of a prototype column for diffusion-based separations.

An optical micrograph of a prototype column for diffusion-based separations is shown in FIG. 2. Fabrication of such a device is accomplished in one of many known manners. Standard microfabrication techniques of photolithography define the structured microfluidic channel. Reactive ion etching transfers the features into a substrate, such as a silicon wafer, followed by growth of a thermal oxide layer to provide electrical isolation. Electron beam lithography or X-ray lithography are used in further embodiments to obtain structures with even smaller dimensions. The structures may also be embossed from a lithographic master.

A coverslip, such as a Pyrex® coverslip is anodically bonded to the chip to create the final side of the columns. Alternatively, a sacrificial layer is used to create the columns. The sacrificial layer is patterned using lithographic techniques, and a capping layer is deposited on top of the patterned sacrificial layer and then the sacrificial layer is etched away, leaving the structured microfluidic device.

Figure 3:
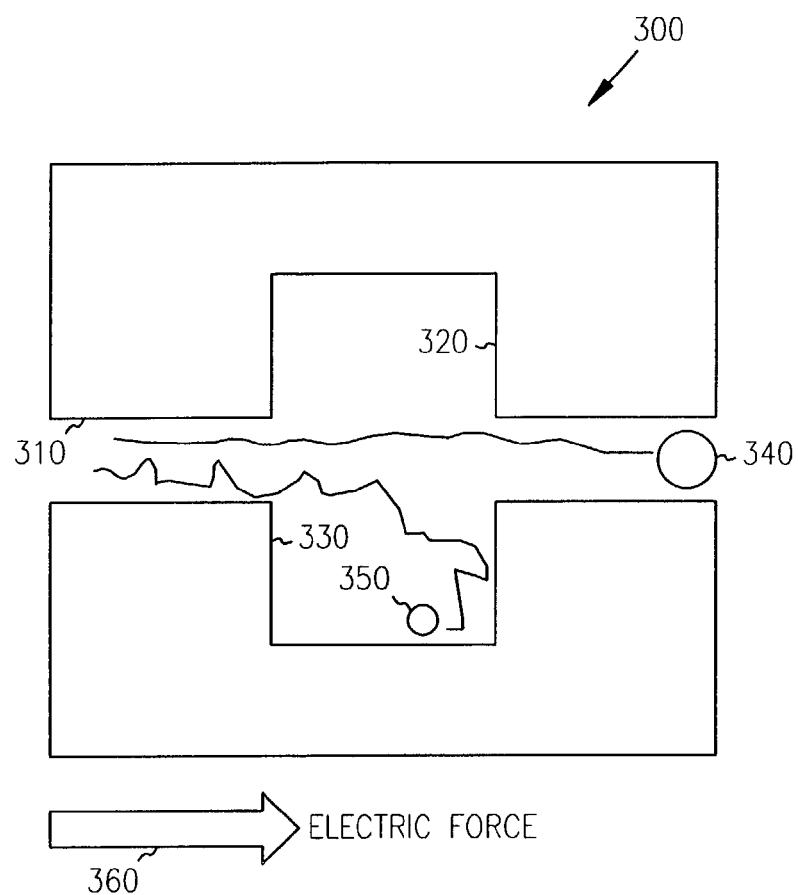
FIG. 3 is a schematic representation of wells in a column of FIG. 1, showing molecules having different diffusion rates.

A schematic diagram (not to scale) showing the interaction of molecules with wells in a microfluidic device is shown in FIG. 3 at 300. A channel 310 has a first well 320 and a second opposing well 330 formed therein. A first molecule 340 is shown progressing through the channel 310. It has a relative slow diffusion rate, and is not significantly affected by the wells because it is less likely to diffuse far enough during the time it is traveling past the well to substantially enter the well. A second molecule 350 is shown having a higher diffusion rate, and is more likely to significantly encounter well 330. To move further down the channel 310, the molecule must exit the well. The path taken by this molecule is longer than that taken by the slower diffusing molecule 340, causing it to exit or elute from the channel a greater length of time after the first molecule 340.

This effect is repeated several times during movement of the mixture down the channel, encountering several features such as the wells, with an increased probability of being delayed by the features. If a sufficient number of features are dispersed along the channel, a substantial separation of components of the mixture having different diffusion rates occurs. Monte Carlo simulations show that narrower channels and deeper wells work well. The actual sizes are somewhat dependent on the compounds to be separated and the viscosity of the mixture.

In one embodiment, the mixture comprises compounds to be separated in a fluid. The fluid is conductive to enable electroosmotic flow to drive the fluid through the channel. An electric field is applied to cause the mixture to flow in one embodiment. Other methods of causing flow are used in further embodiments, such as gravity, capillary action, pressure differential and others.

Figure 4:
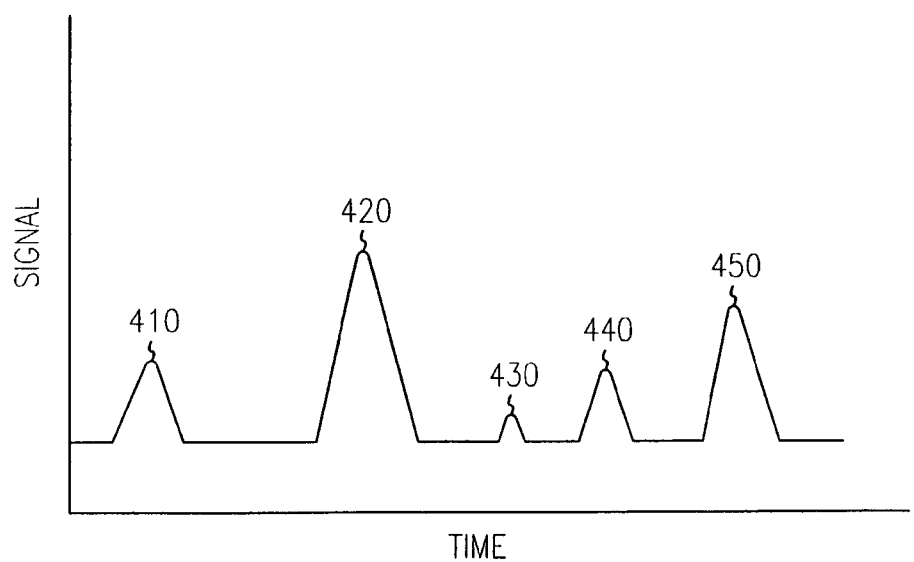
FIG. 4 is a chronological representation of components exiting a diffusion-based separation column.

FIG. 4 is a hypothetical chronological representation of components in a five component mixture eluting from a microfluidic column. The components elute from the column in reverse order of diffusion speed. The component with the slowest diffusion rate elutes first at 410. The next slowest at 420, followed by successively faster diffusion rate components respectively at 430, 440 and 450. In addition separation of materials, further dispersion of components is also provided, facilitating identification of such components.

Figure 5:
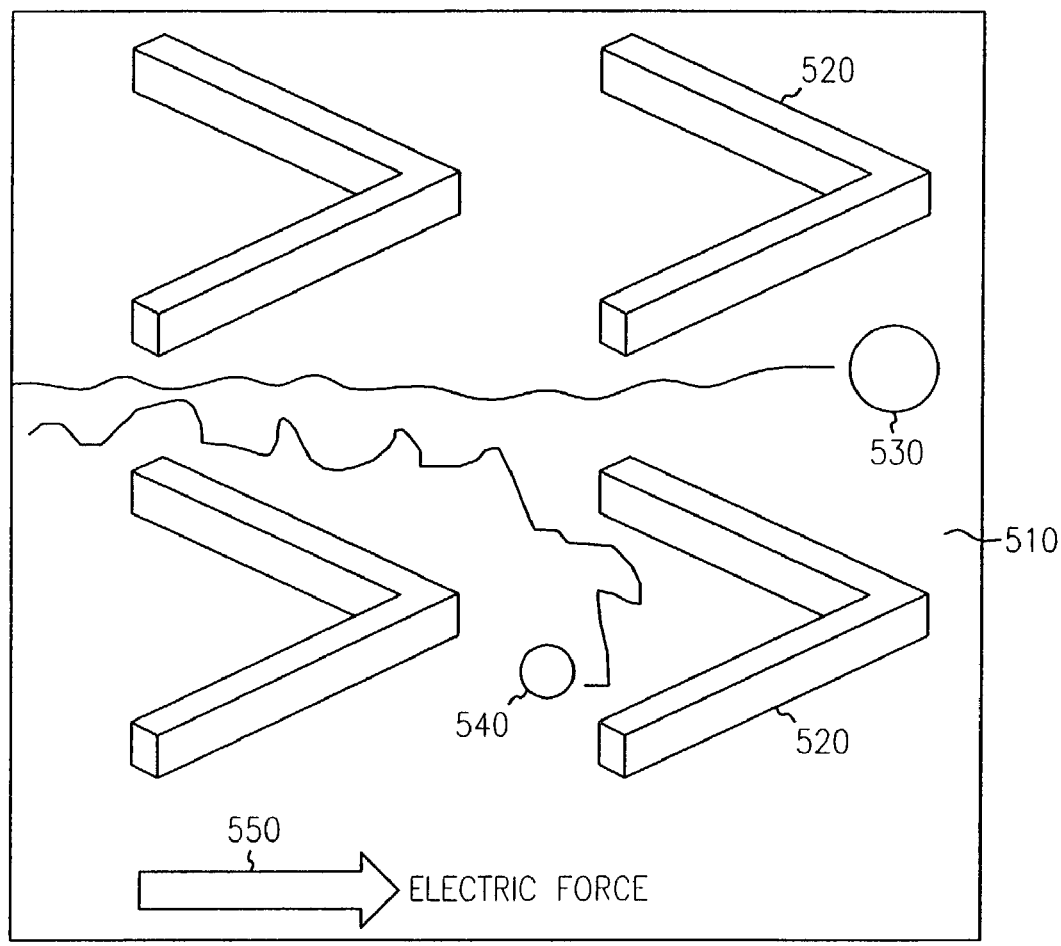
FIG. 5 is a schematic representation of one alternative structure to wells.

FIG. 5 illustrates an alternative feature to slow the movement of molecules having higher diffusion speeds through a channel. The features adjacent a main channel 510 are v-shaped structures 520. A first molecule 530 is shown progressing through the channel 510. It has a relative slow diffusion rate, and is not significantly affected by the wells because it is less likely to diffuse far enough during the time it is traveling past the well to substantially enter the well. A second molecule 540 is shown having a higher diffusion rate, and is more likely to significantly encounter a structure 520. To move further down the channel 510 in the presence of an electric field 550, the molecule must exit the structure. The path taken by this molecule is longer than that taken by the slower diffusing molecule 530, causing it to exit or elute from the channel a greater length of time after the first molecule 530.

This effect is repeated several times during movement of the mixture down the channel, encountering several features such as the v-shaped structures, with an increased probability of being delayed. If a sufficient number of features are dispersed along the channel, a substantial separation of components of the mixture having different diffusion rates occurs.

In one embodiment of forming channels with structures, a silicon master is created using standard photolithographic techniques. A well known hot embossing technique is used with the master to create the microfluidic device from plastic, such as Zeonor. Other polymers may also be used. After the channels and structures are created, a top piece of plastic is thermally bonded to it to seal the channels.

CONCLUSION

Separation or purification provided by the microfluidic device herein is an important task to accomplish to facilitate construction of complex devices on chips. The microfluidic device is simple to fabricate and incorporate into multifluidic networks. The structure provides a "gel-free" method for separation of biological molecules. Proteins separated by use of the structure retain their native conformations, facilitating on-chip post-separation enzymatic assays. The microfluidic device advantageously utilizes small volumes of material.

What is claimed is:
1. A microfluidic structure comprising:
    a central channel formed to ensure substantially laminar flow of a multicompound mixture, the central channel comprising a width of approximately 2 microns and a depth of approximately 700 microns; and
    a plurality of features extending from the central channel, each feature comprising a single opening coupling each feature to the central channel, the single opening comprising approximately 4 microns, the features comprising a depth of approximately 10 microns, and the features separated from each other by approximately 10 microns, such that compounds having faster diffusion rates are delayed significantly more than compounds having slower diffusion rates in the mixture.

2. The microfluidic structure of claim 1 wherein the central channel is designed with a low Reynold's number with respect to the mixture to create laminar flow of the mixture.

3. The microfluidic structure of claim 1 wherein the structure is formed in a substrate.

4. The microfluidic structure of claim 1 wherein the structure is part of a multifunction lab on a substrate.

5. The microfluidic structure of claim 1 wherein compounds are separated in time exiting the channel based on their diffusion rates.

6. A microfluidic structure comprising:
a central channel formed to ensure substantially laminar flow of a multicompound mixture, the central channel comprising a width of approximately 2 microns and a depth of approximately 700 microns; and
multiple opposing features disposed along the central channel and extending from the central channel, each feature comprising a single opening of approximately 4 microns coupling each feature to the central channel, the features comprising a depth of approximately 10 microns, and the features separated from each other by approximately 10 microns, such that compounds having faster diffusion rates are delayed significantly more than compounds having slower diffusion rates in the mixture.

7. The microfluidic structure of claim 6 wherein the central channel is designed with a low Reynold's number with respect to the mixture to create laminar flow of the mixture.

8. The microfluidic structure of claim 6 wherein the structure is formed in a substrate.

9. The microfluidic structure of claim 6 wherein compounds are separated in time exiting the central channel based on their diffusion rates.

10. A microfluidic structure comprising:
a central channel formed to ensure substantially laminar flow of a multicompound mixture, the central channel comprising a width of approximately 2 microns and a depth of approximately 700 microns; and
multiple opposing features disposed along the central channel and extending from the central channel a limited length, each multiple opposing feature comprising a single opening of approximately 4 microns coupling each feature to the central channel, the features comprising a depth of approximately 10 microns, and the features separated from each other by approximately 10 microns, such that compounds having faster diffusion rates are delayed significantly more than compounds having slower diffusion rates in the mixture without allowing flow of the multicompound mixture through the features.

11. The microfluidic structure of claim 10 wherein the limited length of the features is approximately 10 microns or less.

12. The microfluidic structure of claim 10 wherein each feature is wider than the width of the central channel.

13. The microfluidic structure of claim 10 wherein the limited length of the features is approximately less than 10 microns.

14. The microfluidic structure of claim 13 wherein each feature is wider than the width of the central channel.

15. The microfluidic structure of claim 10 wherein the features have dimensions including a depth and width relative to the width of the central channel such that the delay of flow of compounds having faster diffusion rates is significant and substantially due to such dimensions.

16. A microfluidic structure comprising:
a central channel formed to ensure substantially laminar flow of a multicompound mixture, the central channel comprising a width of approximately 2 microns and a depth of approximately 700 microns; and
multiple opposing features disposed along the central channel and extending from the central channel a limited length, each feature comprising a single opening of approximately 4 microns coupling each feature to the central channel, the features comprising a depth of approximately 10 microns, and the features separated from each other by approximately 10 microns, such that flow of compounds having faster diffusion rates is delayed compared to compounds having slower diffusion rates without allowing flow through the features, and wherein the features are shaped such that faster diffusing compounds are significantly slowed by such features, and exit the channel after the slower diffusing compounds.

* * * * *